United States Patent
Headrick, Jr.

(10) Patent No.: US 9,090,507 B2
(45) Date of Patent: Jul. 28, 2015

(54) LOW CEMENT SPINEL STABILIZED SILICON CARBIDE COMPOSITE MATERIAL

(71) Applicant: Missouri Refractories, Pevely, MO (US)

(72) Inventor: William L. Headrick, Jr., Pevely, MO (US)

( * ) Notice: Subject to any disclaimer, the term of this patent is extended or adjusted under 35 U.S.C. 154(b) by 0 days.

(21) Appl. No.: 13/865,488

(22) Filed: Apr. 18, 2013

(65) Prior Publication Data

US 2014/0311385 A1    Oct. 23, 2014

(51) Int. Cl.
| | |
|---|---|
| *C04B 7/32* | (2006.01) |
| *C04B 35/565* | (2006.01) |
| *C04B 14/30* | (2006.01) |
| *C04B 28/06* | (2006.01) |
| *C04B 35/66* | (2006.01) |
| *C04B 35/76* | (2006.01) |
| *C04B 35/80* | (2006.01) |

(52) U.S. Cl.
CPC .............. *C04B 14/303* (2013.01); *C04B 28/06* (2013.01); *C04B 35/565* (2013.01); *C04B 35/66* (2013.01); *C04B 35/76* (2013.01); *C04B 35/806* (2013.01); *C04B 2235/3206* (2013.01); *C04B 2235/3208* (2013.01); *C04B 2235/3217* (2013.01); *C04B 2235/3222* (2013.01); *C04B 2235/3418* (2013.01); *C04B 2235/3463* (2013.01); *C04B 2235/3826* (2013.01); *C04B 2235/5427* (2013.01); *Y02W 30/94* (2013.01)

(58) Field of Classification Search
CPC ................................ C04B 7/32; C04B 35/565
USPC ........................................ 106/692; 501/88, 89
See application file for complete search history.

(56) References Cited

U.S. PATENT DOCUMENTS

| | | |
|---|---|---|
| 6,458,732 B1 | 10/2002 | Doza et al. |
| 8,017,058 B2 | 9/2011 | Oba et al. |

*Primary Examiner* — Paul Marcantoni
(74) *Attorney, Agent, or Firm* — C. John Brannon; Brannon Sowers & Cracraft PC

(57) ABSTRACT

An oxidation resistant low cement silicon carbide composite material, including a high alumina cement matrix portion in an amount of about 8 weight percent, a high alumina spinel portion in an amount between about 5 weight percent and about 20 weight percent, a silica fume portion in an amount of about 8 percent, a chrome aluminum stainless steel alloy needle additive portion, and a silicon carbide portion in an amount defining a remainder of the composition. The high alumina cement portion contains about 68 weight percent alumina and about 31 weight percent calcia, and the high alumina spinel portion contains about 78 weight percent alumina and about 22 weight percent magnesia.

11 Claims, No Drawings

LOW CEMENT SPINEL STABILIZED SILICON CARBIDE COMPOSITE MATERIAL

TECHNICAL FIELD

The present invention relates generally to ceramic materials and, more particularly, to a castable or concrete composition having high-alumina spinel as an antioxidant.

BACKGROUND

Ceramic cements are mixtures of water and reactive metal oxides that harden and fasten upon setting. Cements have a variety of familiar uses, such as the adhesive component to concrete (essentially an agglomeration of rocks held together by cement), the bonding layer that holds bricks together to form walls, as structural building materials such as patio or garage slabs, as the matrix component of ceramic composite materials, and the like.

Ceramic composite materials use cements as a matrix to support a distribution of other materials therein. These materials may be fibers, spheres, rods, needles, irregularly shaped objects, or the like, as well as combinations thereof. While concrete is the most obvious example of a ceramic composite material, such composites may be compositionally tailored to yield desired combinations of physical properties.

Furnace linings, for example, may be made of ceramic composites. One requirement of furnace lining materials is that they be refractory. Another desired furnace lining property is a resistance to oxidation, while others include resistance to chemical attack, strength, and toughness. Silicon carbide is an inexpensive, chemically stable, and tough refractory material that is well suited for cementitious composite applications. However, SiC is prone to oxidation, yielding silica and carbon dioxide. Anti-oxidation additives, such as boron containing materials like BN, Si metal, Al metal, and/or carbonaceous materials are commonly included in SiC-cement composites to retard oxidation of SiC. However, these anti-oxidants typically detract from the other desired parameters, such as refractoriness, toughness, strength, and the like, as well as increase the cost of the material and/or introduce thermal expansion mismatches into the matrix that give rise to creep and degradation over time and with thermal cycling. Thus, there is a need for a SiC-cement composite that is oxidation resistant without sacrificing other desired parameters. The present novel technology addresses this need.

DETAILED DESCRIPTION OF THE PREFERRED EMBODIMENT

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

The present invention relates to a generally homogeneous low cement composite material having a high alumina portion, a high alumina spinel portion, a silica portion, a SiC or aggregate portion, and a chrome aluminum stainless steel alloy needle portion. The SiC portion is present with a particle size distribution (PSD) typically ranging from diameters of about 4 mm diameters to about 0.1 mm, more typically in the range between about 3.5 mm to about 0.15 mm, although any convenient PSD ranges may be selected. The SiC PSD is typically skewed coarse, with its primary peak falling between 2.5 and 1.0 mm.

The cement portion of the batch is typically fine powder high alumina cement, with the remainder being substantially calcia and with traces of silica, magnesia, sodium oxide, iron oxide and the like. The cement portion is typically at least about 65 weight percent alumina, more typically about 70 weight percent alumina, yet more typically about 73 weight percent alumina, and still more typically about 75 weight percent or more alumina. Typically, the cement is fine enough to pass through a 170 mesh sieve with less than 5% residue (i.e., particle size less than about 90 microns).

The cement portion is typically present in small amounts, typically less than 10 weight percent of the entire batch, more typically between about 4 and about 8 weight percent. The low cement batch composition thus requires a relatively small amount of water and, when hydrated, yields a relatively thick and stiff working slurry.

The spinel portion is typically mostly alumina with the remainder being substantially magnesia. Typically, the spinel portion is at least about 70 weight percent alumina, more typically about 73 weight percent alumina, still more typically about 75 weight percent alumina, and yet more typically about 80 or more weight percent alumina. Likewise, the spinel portion is typically a fine powder, more typically fine enough to pass through a 170 mesh sieve with less than 5% residue (i.e., particle size less than about 90 microns).

The spinel portion is typically present in small amounts, typically less than 20 weight percent of the entire batch, more typically between about 10 and about 20 weight percent. The SiC/aggregate portion is present as the remainder of the batch, typically in an amount of at least about 35 weight percent, more typically between about 35 and about 90 weight percent, still more typically between about 50 and about 80 weight percent, and yet more typically between about 60 and about 70 weight percent. While this portion is typically SiC, up to 90 percent of the aggregate portion may be calcined bauxite, mullite, fireclay or the like, with the remainder SiC. Greater amounts of SiC typically yield greater thermal shock resistance.

The silica portion is typically a very fine powder, such as silica fume. The silica portion is typically substantially −500 mesh. The silica portion is typically present in an amount between about 5 and about 12 weight percent.

In some embodiments, additional aggregate materials, such as whiskers, fibers, rods, generally round or oblong aggregate material, needles, or the like are sized and added to the batch. These materials provide tailored physical properties, such as enhanced toughness, strength, refractoriness, or the like. These additive materials are typically present in amounts of less than about 5 weight percent, more typically between about 1 and about 4 weight percent, still more typically between about 2 and about 4 weight percent, and yet more typically about 3 weight percent.

In operation, the batch constituents are sized and weighed out as desired according to a predetermined batch recipe and dry mixed. A predetermined amount of water sufficient to drive the cementitious reaction is measured and a added to the dry mix to yield a stiff slurry. The stiff slurry is sufficiently mixed to yield a working slurry, which is then applied as desired to form a furnace lining, brick, green body or the like. The lining/brick/green body is then allowed to set and cure to yield a final composite body.

As the green body cures and the subsequent final composite body ages and thermal cycles, the presence of the high alumina spinel acts to retard oxidation of the SiC. Further, the high alumina spinel has a coefficient of thermal expansion that more closely matches the SiC and cementitious matrix, thus reducing thermal shock, creep and degradation of the composite body over time.

Example

A batch composition is prepared and mixed according to Table 1 to yield an admixture.

TABLE 1

| Ingredient | % |
| --- | --- |
| SIC | 65 |
| AR 78-0.045 | 17 |
| CALCIUM ALUMINATE CEMENT | 7.5 |
| SILICA FUME | 7.5 |
| ADDITIVES | 0.1 |
| NEEDLES ALPHA ¾" | 3 |

A predetermined amount of water is added to the admixture and mixed to yield a working slurry. The needles form an alumina-coated chrome aluminum stainless steel alloy during use. The slurry is applied to the interior of a wood pellet burner, biomass burner, gasifier or any other high temperature alkali containing fuel burning device to define a lining, and the lining is subsequently allowed to set and cure.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

I claim:

1. An oxidation resistant low cement silicon carbide composite composition, comprising:
   high alumina cement in an amount between about 5 weight percent and about 10 weight percent;
   high alumina spinel in an amount between about 5 weight percent and about 20 weight percent;
   silica in an amount of between about 5 and about 12 percent; and
   silicon carbide refractory aggregate in an amount defining a remainder of the composition, wherein the high alumina cement contains at least about 65 weight percent alumina; and
   wherein the high alumina spinel contains at least about 70 weight percent alumina.

2. The composition of claim 1 and further comprising an additive in an amount of no more than about 5 weight percent.

3. The composition of claim 2 wherein the additive is selected from the group consisting of fibers, needles, round aggregate, rods, whiskers, needles, and combinations thereof.

4. The composition of claim 2 wherein the additive is a plurality of chrome aluminum stainless steel alloy needles.

5. The composition of claim 1 wherein the alumina cement contains a first alumina and a first remainder portion, and wherein the first remainder portion is calcia.

6. The composition of claim 1 wherein the spinel contains a second alumina and a second remainder, and wherein the second remainder is magnesia.

7. The composition of claim 1 wherein about 90 percent of the refractory aggregate is silicon carbide sized between 6-100 mesh.

8. The composition of claim 1 wherein the silica is silica fume.

9. The composition of claim 1 wherein up to 90 percent of the refractory aggregate is selected from the group consisting of calcined bauxite, mullite, fireclay and combinations thereof, with the remainder being SiC.

10. An oxidation resistant low cement silicon carbide composite material, comprising:
    high alumina cement matrix in an amount of about 8 weight percent;
    high alumina spinel in an amount between about 5 weight percent and about 20 weight percent;
    silica fume in an amount of about 8 percent;
    chrome aluminum stainless steel alloy needle additive; and
    silicon carbide in an amount defining a remainder of the composition;
    wherein the high alumina cement contains about 68 weight percent alumina and about 31 weight percent calcia; and
    wherein the high alumina spinel contains about 78 weight percent alumina and about 22 weight percent magnesia.

11. The material of claim 10 wherein about 18 weight percent of the silicon carbide is 6-10 mesh; wherein about 30 weight percent of the silicon carbide is 8-16 mesh; wherein about 12 weight percent of the silicon carbide is 16-30 mesh; wherein about 6 weight percent of the silicon carbide is 30-50 mesh; wherein about 12 weight percent of the silicon carbide is 50-100 mesh; and wherein about 12 weight percent of the silicon carbide is −100 mesh.

* * * * *